(12) United States Patent
Todorovic

(10) Patent No.: US 10,738,735 B2
(45) Date of Patent: Aug. 11, 2020

(54) CONVERGENT-DIVERGENT NOZZLE FOR A TURBOFAN ENGINE OF A SUPERSONIC AIRCRAFT AND METHOD FOR ADJUSTING THE NOZZLE THROAT SURFACE IN A NOZZLE OF A TURBOFAN ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 440 days.

(21) Appl. No.: 15/901,365

(22) Filed: Feb. 21, 2018

(65) Prior Publication Data
US 2018/0245539 A1 Aug. 30, 2018

(30) Foreign Application Priority Data
Feb. 27, 2017 (DE) .................. 10 2017 104 036

(51) Int. Cl.
*F02K 1/08* (2006.01)
*F02K 3/06* (2006.01)
(Continued)

(52) U.S. Cl.
CPC .............. *F02K 1/08* (2013.01); *B64C 30/00* (2013.01); *B64D 27/20* (2013.01); *B64D 33/04* (2013.01);
(Continued)

(58) Field of Classification Search
CPC ..... F02K 1/06; F02K 1/08; F02K 1/28; F02K 1/30; F02K 1/38; F02K 1/386; F05D 2220/80; B64C 30/00; B64D 2033/026
See application file for complete search history.

(56) References Cited

U.S. PATENT DOCUMENTS 3,441,218 A * 4/1969 Bucher ............. F02K 1/08
239/265.25
3,598,318 A * 8/1971 Schiel ............. F02K 1/06
239/265.13
(Continued)

FOREIGN PATENT DOCUMENTS

DE 4222947 1/1994
EP 2472089 A2 7/2012
(Continued)

OTHER PUBLICATIONS

German Search Report dated Oct. 11, 2017 for counterpart German Application No. DE10 2017 104 036.6.
(Continued)

*Primary Examiner* — Gerald L Sung
*Assistant Examiner* — Colin J Paulauskas
(74) *Attorney, Agent, or Firm* — Shuttleworth & Ingersoll, PLC; Timothy J. Klima

(57) ABSTRACT

A convergent-divergent nozzle for a turbofan engine of a supersonic aircraft, wherein the nozzle has an inner wall and forms a flow channel with a nozzle throat surface and a nozzle exit surface. A trim ring that is displaceable in the axial direction between a first position and a second position is provided, wherein the inner wall of the nozzle and the trim ring are embodied and positioned with respect to each other in such a manner that the trim ring extends at a radial distance to the inner wall in the first position, wherein a ring-shaped bypass channel is provided, extending between the trim ring and the inner wall of the nozzle, and the trim ring abuts the inner wall in the second position.

19 Claims, 7 Drawing Sheets

(51) Int. Cl.
  *B64C 30/00*   (2006.01)
  *B64D 27/20*   (2006.01)
  *B64D 33/04*   (2006.01)
  *F02K 1/15*    (2006.01)
  *F02K 1/46*    (2006.01)

(52) U.S. Cl.
  CPC .............. *F02K 1/15* (2013.01); *F02K 1/46* (2013.01); *F02K 3/06* (2013.01); *F05D 2220/80* (2013.01)

(56) References Cited

U.S. PATENT DOCUMENTS

| | | | | |
|---|---|---|---|---|
| 3,739,984 | A * | 6/1973 | Tontini | F02K 1/002 |
| | | | | 239/265.17 |
| 5,351,480 | A | 10/1994 | Kretschmer | |
| 5,884,843 | A * | 3/1999 | Lidstone | F02K 1/34 |
| | | | | 181/220 |
| 6,901,739 | B2 | 6/2005 | Christopherson | |
| 8,459,036 | B2 | 6/2013 | Baker | |
| 9,464,594 | B2 * | 10/2016 | Pesyna | F02K 1/1207 |
| 2006/0016171 | A1 | 1/2006 | Renggli | |
| 2008/0112802 | A1 * | 5/2008 | Orlando | F02K 1/08 |
| | | | | 415/208.1 |
| 2009/0158703 | A1 * | 6/2009 | Petty | F02K 1/386 |
| | | | | 60/230 |
| 2012/0128467 | A1 | 5/2012 | Ruthemeyer | |
| 2012/0167549 | A1 * | 7/2012 | Lariviere | F02K 3/10 |
| | | | | 60/204 |
| 2014/0238043 | A1 * | 8/2014 | Sokhey | F02K 1/36 |
| | | | | 60/805 |
| 2016/0208715 | A1 * | 7/2016 | Ruberte Sanchez | F02K 1/386 |
| 2016/0230675 | A1 * | 8/2016 | Lovett | F02K 1/383 |
| 2016/0305371 | A1 | 10/2016 | Todorovic | |
| 2018/0266361 | A1 * | 9/2018 | Koepf | B64D 27/16 |

FOREIGN PATENT DOCUMENTS

| | | |
|---|---|---|
| EP | 2966267 | 1/2016 |
| EP | 3081797 | 10/2016 |
| WO | WO2015026417 A2 | 2/2015 |

OTHER PUBLICATIONS

European Search Report dated Jun. 20, 2018 for counterpart European Patent Application No. 18158530.8.

* cited by examiner

CONVERGENT-DIVERGENT NOZZLE FOR A TURBOFAN ENGINE OF A SUPERSONIC AIRCRAFT AND METHOD FOR ADJUSTING THE NOZZLE THROAT SURFACE IN A NOZZLE OF A TURBOFAN ENGINE

REFERENCE TO RELATED APPLICATION

This application claims priority to German Patent Application No. 10 2017 104 036.6 filed on Feb. 27, 2017, the entirety of which is incorporated by reference herein.

BACKGROUND

The invention relates to a convergent-divergent nozzle for a turbofan engine of a supersonic aircraft and a method for adjusting the nozzle throat surface in a nozzle of a turbofan engine.

In a convergent-divergent nozzle having a nozzle throat surface (usually referred to as A8) and a nozzle exit surface (usually referred to as A9), it is generally desirable if the degree of expansion of the flow channel behind the nozzle throat surface, that is, the ratio of A9 to A8, can be adjusted in a desired manner for different operational states.

For this purpose, it is known to design a nozzle with a variable contour, for example as an iris/petal nozzle with a plurality of individual adjustable lamellas. Thus, it is known to provide a group of convergent lamellas and a group of divergent lamellas in a nozzle, which are respectively arranged in a circular manner. In order for the individual lamellas to be adjustable, they are provided which actuators. Such a nozzle is for example known from U.S. Pat. No. 9,464,594 B2, as well as from engines of the fighter jets McDonnell Douglas F-15, Suchoi Su-27, and Suchoi Su-34. A disadvantage of such nozzles in iris/petal design is their complex structure, a high maintenance intensity, a complex control, and a relatively high weight due to the need for a plurality of actuators. In addition, high flow losses occur at the individual lamellas.

EP 2 966 267 A1 discloses is a nozzle arrangement in which a gas turbine has separate nozzles for the bypass channel, the primary flow channel, and for a mixer. An axially displaceable trim ring is dedicated to the mixer, with its axial position altering the exit cross section of the nozzle that is assigned to the mixer.

The fighter jet Messerschmidt 262 realized an engine that comprised a nozzle with a central body that was axially adjustable for adjusting the nozzle exit surface.

There is a need to provide a nozzle of a turbofan engine that is suitable for supersonic operation, as well as a method by means of which an efficient adjustment of the nozzle throat surface and/or the nozzle exit surface is facilitated.

SUMMARY

According to an aspect of the invention there is provided a trim ring in a convergent-divergent nozzle, wherein the trim ring is displaceable in the axial direction between a first position and a second position. The inner wall of the nozzle and the trim ring are embodied and positioned with respect to each other in such a manner that, in the first position, the trim ring extends at a radial distance to the inner wall, wherein a ring-shaped bypass channel is provided, extending between the trim ring and the inner wall of the nozzle. In contrast to that, in the second position, the trim ring abuts the inner wall, so that the bypass channel is closed, or that it effectively no longer exists.

What is referred to herein as the nozzle throat surface is the narrowest cross-sectional surface of the flow channel, and what is referred to as the nozzle exit surface is the cross-sectional surface of the flow channel at the rear end of the nozzle.

The bypass channel provides an additional cross-sectional surface of the flow channel. The bypass channel is formed in the first position in that the trim ring is radially distant from the inner wall (and radially inside the inner wall) along the complete length of the trim ring. The area between the trim ring and the inner wall forms the bypass channel.

Aspects of the invention are thus based on the idea of varying the nozzle throat surface by means of a trim ring that is adjustable in the axial direction, wherein a bypass channel provides an additional cross-sectional surface that contributes to the nozzle throat surface depending on the axial position of the trim ring. In the first position, i.e. the one extreme position of the trim ring, the nozzle throat surface is in particular formed by the sum of the smallest cross-sectional surface of the trim ring and the smallest cross-sectional surface of the bypass channel. In contrast to that, in the second position, i.e. the other extreme position, the nozzle throat surface is formed only by the narrowest cross-sectional surface of the trim ring. During the axial movement of the trim ring from the first position into the second position, the additional cross-sectional surface provided by the bypass channel is reduced to zero in the second position. Reversely, the bypass channel successively opens as the trim ring is being displaced from the second position in the direction of the first position, thus moving away from the inner wall of the nozzle. In the course of this process, the trim ring can take one, multiple or any number of axial positions between the first position and the second position, i.e. it is not limited to being placed in the first or second position. As a result, the additional cross-sectional surface provided by the bypass channel can be set in a finely graduated manner.

Aspects of the present invention thus facilitate an adjustment of the degree of expansion of the flow channel behind the nozzle throat surface or of the ratios of the nozzle exit surface to the nozzle throat surface by varying the nozzle throat surface, with the nozzle exit surface remaining stationary.

Aspects of the invention facilitate the adjustment of the degree of expansion without having to design the inner wall of the nozzle, which represents the radially outer boundary of the flow channel inside the nozzle, in an adjustable manner. The modification of the nozzle throat surface is achieved by means of an axial displacement of the trim ring and an associated provision of an additional cross-sectional surface, contributing to the nozzle throat surface, in a bypass channel. In this manner, an otherwise necessary laborious and weight-intensive embodiment of the nozzle as a nozzle with a variable contour, for example as an iris/petal nozzle with a plurality of individual adjustable lamellas can be foregone, so that the complexity and weight of the nozzle are reduced thanks to the invention. A further advantage is that, as the lamellas are omitted, a smooth outer boundary of the flow channel through the nozzle can be provided for forming the inner wall of the nozzle.

In one embodiment of the invention, it is provided that the first position is an upstream position and the second position is a downstream position, wherein in the upstream position the bypass channel is formed between the trim ring and the inner wall of the nozzle, and in the downstream position the trim ring abuts the inner wall. The upstream position is also referred to as extended position, and the upstream position is referred to as the stowing position, since in the latter the trim ring abuts the inner wall of the nozzle.

According to one embodiment of the invention, the trim ring has an upstream area that converges in the flow direction. In particular, it can be provided that the trim ring is embodied so as to be conical in its upstream area, having a cross-sectional surface that converges in the flow direction. A cylindrical area and/or an area that is divergent in the flow direction connects to the upstream area downstream. Thus, the trim ring has a minimum of its cross-sectional surface in the cylindrical area (if present), or alternatively in the transition from the upstream area to the divergent downstream area. Here, it can be provided that the trim ring has a protrusion in the area of its minimum.

According to one embodiment, the trim ring has a cylindrical area adjoining the upstream area and a downstream area adjoining the cylindrical area, wherein the downstream area diverges in the flow direction. According to this embodiment variant, the trim ring thus consists of three axially successive areas, namely a convergent area, a cylindrical area, and a divergent area.

The inner wall of the nozzle also forms a convergent area in which the cross-sectional surface of the inner wall converges in the flow direction. In the convergent area, the inner wall of the nozzle may for example be embodied in a conical manner. Downstream of the convergent area, the inner wall forms a cylindrical and/or a divergent area.

Here, it is provided that the upstream area of the trim ring, which converges in the flow direction, and the convergent area of the inner wall extend at least partially across the same axial area of the nozzle when the trim ring is in the first position. In one respective embodiment, it is provided that the upstream area of the trim ring and the convergent area of the inner wall extend substantially parallel to each other when the trim ring is in the first position. As a result, a bypass channel with a substantially constant cross section is provided, inside of which the flow can flow in a low-loss manner.

In a further embodiment, it is provided that the upstream edge of the upstream area of the trim ring abuts the inner wall of the nozzle in the second position. Thus, in the second position, the trim ring abuts the inner wall along a circumferential line. Here, the circumferential line is located on a plane that extends perpendicular to the axial direction or to the machine axis. However, the abutment of the trim ring at the inner wall along a circumferential line in the second position represents only one exemplary embodiment. In principle, the trim ring can also abut the inner wall along a circumferential surface in the second position. That depends on the specific shape of the trim ring and the inner wall.

In one embodiment, it is provided that the leading edge of the upstream area of the trim ring abuts the inner wall of the nozzle in the convergent area of the inner wall or at the transition of the convergent area to a cylindrical or divergent area connecting downstream thereto.

According to one embodiment of the invention, the inner wall of the nozzle forming the radially outer boundary of the flow channel inside the nozzle is embodied in a non-adjustable manner. As has already been explained, a modification of the nozzle throat surface is achieved by axially displacing the trim ring. Thus, an otherwise necessary, but laborious and weight-intensive embodiment of the nozzle as a nozzle with a variable contour can be foregone. However, it is to be understood that in principle an axially displaceable trim ring can also be combined with a variable or partially variable outer contour of the nozzle.

The nozzle can be embodied as a three-dimensional nozzle or as a two-dimensional nozzle. In the case of a three-dimensional nozzle, its inner wall has a circular cross section. The trim ring is correspondingly embodied as a circular ring which is embodied so as to be rotationally symmetric with respect to the machine axis of the turbofan engine. In the case of a two-dimensional nozzle, its inner wall is embodied with a rectangular cross section. In that case, the trim can also be embodied with a rectangular cross section (with rounded edges).

In one embodiment of the invention, it is provided that the inner wall and the outer wall of the trim ring as well as the inner wall of the nozzle are embodied so as to be smooth in the mathematical sense, that is, they are not provided with edges.

According to one embodiment, the trim ring of the present invention is embodied as a single piece. It may for example consist of a metallic or a ceramic material. However, in principle it is alternatively possible that the ring consist of a plurality of partial rings that are respectively axially displaceable.

According to an embodiment the nozzle does not comprise a central body which extends along the engine center line of the turbofan engine. Such central body is not required.

According to a further aspect of the invention, the invention relates to a convergent-divergent nozzle for a turbofan engine of a supersonic aircraft, comprising:

an inner wall that delimits a flow channel through the nozzle radially outside, wherein the flow channel forms a nozzle throat surface and a nozzle exit surface, and a trim ring that is displaceable in the axial direction between a first position and a second position, wherein the inner wall of the nozzle and the trim ring are embodied and positioned with respect to each other in such a manner, that, in the first position, the trim ring expands at a radial distance to the inner wall, wherein a ring-shaped bypass channel is provided, extending between the trim ring and the inner wall of the nozzle, and the trim ring abuts the inner wall in the second position, the trim ring has an upstream area that converges in the flow direction, wherein a cylindrical area and/or an area that diverges in the flow direction connects to the upstream area downstream, the inner wall of the nozzle forms a convergent area in which the cross-sectional surface of the inner wall converges in the flow direction, and the upstream edge of the upstream area of the trim ring abuts the inner wall of the nozzle in the second position.

In a further aspect of the invention, the invention relates to a nozzle for a turbofan engine of a supersonic aircraft, wherein the nozzle forms a flow channel with a nozzle exit surface. It is provided that, at its downstream end, the nozzle forms a nozzle exit ring that is displaceable in the axial direction between a first, upstream position and a second, downstream position. At that, in the second position of the nozzle exit ring, the nozzle forms a ring-shaped additional flow channel that extends from the outer skin of the nozzle to the flow channel, and via which ambient air can flow into the flow channel. Here, the additional flow channel is formed between the upstream end of the nozzle exit ring and the wall areas of the nozzle that connect to it upstream.

In contrast to that, the ring-shaped additional flow channel is closed in the first position of the nozzle exit ring. The cross-sectional surface of the additional flow channel is successively increased between the first and the second position of the nozzle exit ring. Here, it can be provided that the nozzle exit ring can take corresponding intermediate positions. The additional flow channel is embodied and formed in such a manner that air discharged from the additional flow channel forms a radially outer boundary flow in the flow channel.

As a result, what is achieved through the invention according to this aspect of the invention is an effective reduction of the nozzle exit surface for the gas (which has previously passed the nozzle throat surface) that is flowing inside the flow channel of the nozzle. For, the air that flows in through the additional flow channel is applied to the outer boundary of the flow channel as a boundary flow, so that the gas that flow inside the flow channel does not flow up to the outer boundary of the flow channel. Thus, the nozzle exit surface is indirectly reduced from the geometrical nozzle exit surface to an effective nozzle exit surface. Thus, the effective nozzle exit surface can be adjusted via the axial position of the nozzle exit ring.

In one embodiment, it is provided that the nozzle exit ring forms an outer wall that borders the environment as well as an inner wall that delimits the flow channel, and the additional flow channel is embodied and formed in such a manner that it extends substantially in the axial direction at its downstream end and that is facing towards the flow channel, so that the air that is discharged from the additional flow channel forms a boundary flow extending along the inner wall of the nozzle exit ring and directly adjoining the same. As a result, it is ensured that the flow of the additional flow channel forms a boundary flow at the exit of the nozzle.

In a further embodiment, it is provided that the nozzle is a convergent-divergent or a convergent-cylindrical nozzle, and that the nozzle is embodied in such a manner that the downstream end of the additional flow channel is located downstream of the nozzle throat surface of the nozzle.

Here, the additional flow channel is curved in such a manner that its radial extension component decreases downstream and its axial extension component increases downstream.

The explained aspect of the invention of a nozzle exit ring that is displaceable in the axial direction is realized according to one embodiment in a nozzle that has an axially displaceable trim ring according to the present disclosure. However, this is not necessarily the case. Thus, a nozzle exit ring that is displaceable in the axial direction can in principle be used in any type of nozzle in order to adjust the effective nozzle throat surface, for example also in nozzles in iris/petal design. The nozzle having an axially displaceable trim ring can in principle be a convergent-divergent nozzle, a convergent-cylindrical nozzle, or a merely convergent nozzle. The nozzle can be embodied as a three-dimensional nozzle or as a two-dimensional nozzle.

According to a further aspect of the invention, the invention relates to a method for adjusting the nozzle throat surface in a nozzle of a turbofan engine. The method comprises the steps of:

providing a trim ring that is displaceable in the axial direction between a first position and a second position and that, in the first position, extends at a radial distance to the inner wall as it forms a bypass channel, and abuts the inner wall in the second position, and displacing the trim ring between the first position and the second position for setting the desired smallest cross-sectional surface of the bypass channel, wherein the nozzle throat surface of the nozzle is formed by the sum of the smallest cross-sectional surface of the bypass channel and the smallest cross-sectional surface of the trim ring.

Here, for adjusting a maximum nozzle throat surface, the trim ring is displaced into a maximum upstream position as the first position. For adjusting a minimum nozzle throat surface, the trim ring is displaced into a maximum downstream position as the second position. For adjusting a nozzle throat surface that is located between the maximum and the minimum nozzle throat surface, the trim ring is displaced into a position that is located between the maximum upstream and the maximum downstream position.

It is to be understood that the present invention is described with respect to a cylindrical coordinate system, having the coordinates x, r and φ. Here, x indicates the axial direction, r indicates the radial direction, and φ indicates the angle in the circumferential direction, with the axial direction being identical to the machine axis of the turbofan engine. Beginning at the x-axis, the radial direction points radially outward. Terms such as "in front", "behind", "frontal" and "rear" always refer to the axial direction or the flow direction inside the engine. Thus, the term "in front" means "upstream", and the term "behind" means "downstream". Terms such as "outer" or "inner" always refer to the radial direction.

In further aspects, the invention relates to a turbofan engine with a nozzle according to invention and a civilian or military supersonic aircraft with such a turbofan engine.

BRIEF DESCRIPTION OF THE DRAWINGS

The invention will be explained in more detail on the basis of exemplary embodiments with reference to the accompanying drawings in which.

DETAILED DESCRIPTION

Figure 1:
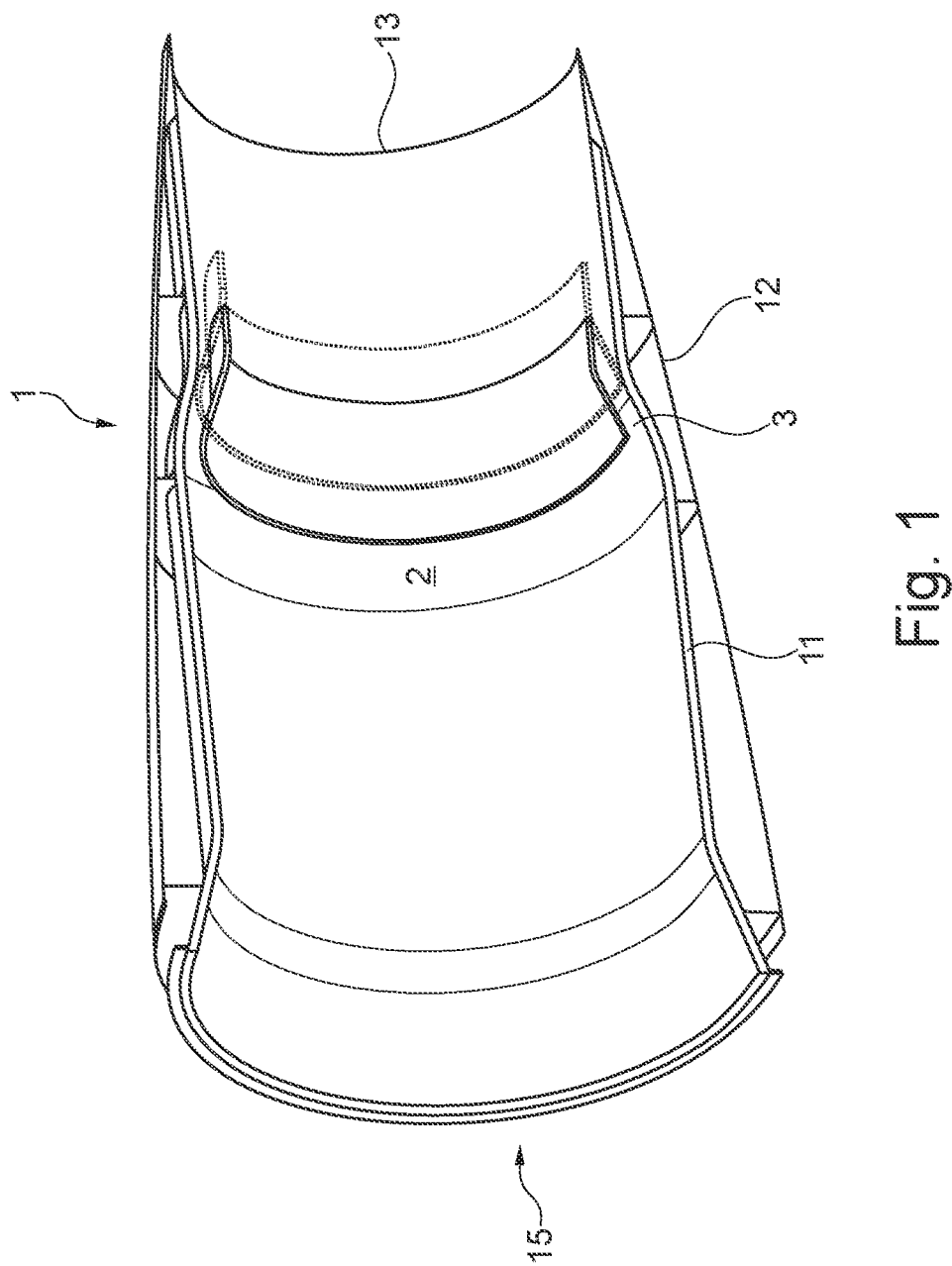
FIG. 1 shows an exemplary embodiment of a nozzle of a turbofan engine that is provided and embodied for supersonic flight, wherein the nozzle has an axially displaceable trim ring, and the trim ring is shown in two axially spaced apart positions.

FIG. 1 shows a convergent-divergent nozzle 1 of a turbofan engine that is provided and suitable for being used in a civilian or military supersonic aircraft, and is correspondingly designed for operating conditions in the subsonic range, in the transsonic range, and in the supersonic range.

The turbofan engine comprises, in a per se known manner, an engine intake, a fan that can be embodied with multiple stages, a primary flow channel leading through a core engine, and a secondary flow channel or bypass channel that is guided past the core engine. Further, a mixer that mixes air of the secondary flow channel and of the primary flow channel behind the core engine is provided. Behind the mixer, the engine forms a flow channel that extends through the nozzle. In addition, an afterburner and/or a thrust reverser can be optionally provided.

The engine intake forms a supersonic air intake and is correspondingly provided and suitable for slowing down the inflowing air to velocities of below Ma 1.0 (Ma=Mach number). The engine intake can be formed in a beveled manner so as to achieve a favorable compression shock configuration during supersonic flight.

The core engine has a compressor, a combustion chamber, and a turbine. For example, the compressor comprises a high-pressure compressor and a low-pressure compressor, wherein a low-pressure compressor can be formed by the areas of the fan that are located close to the hub. The turbine that is arranged behind the combustion chamber comprises a high-pressure turbine and a low-pressure turbine. The high-pressure turbine drives a high-pressure shaft that connects the high-pressure turbine to the high-pressure compressor. The low-pressure turbine drives a low-pressure shaft that connects the low-pressure turbine to the fan. According to an alternative embodiment, the turbofan engine can additionally comprise a medium-pressure compressor, a medium-pressure turbine, and a medium-pressure shaft.

The turbofan engine is arranged inside an engine nacelle that is connected to the fuselage, for example via a pylon.

The turbofan engine comprises a machine axis 10 or engine center line. The machine axis defines an axial direction of the turbofan engine. A radial direction of the turbofan engine extends perpendicular to the axial direction.

FIG. 1 shows an exemplary embodiment of a nozzle 1 that comprises an axially displaceable trim ring 2. At that, FIG. 1 illustrates different axial positions of the trim ring 2. A more detailed description of the trim ring 2 and the advantages and functions that can be achieved by means of it will be provided based on FIGS. 2 to 7.

Structurally, the nozzle 1 is formed by an inner wall 11 and an outer wall 12. The outer wall 12 is formed radially outside of the inner wall 11 and borders the environment. The inner wall 11 forms the radially outer boundary of a flow channel 15 inside the nozzle 1. The flow channel 15 is located behind the mixer of the turbofan engine that mixes the flow in the primary flow channel and the flow in the secondary flow channel of the turbofan engine. Downstream, the inner wall 11 and the outer wall 12 taper off towards each other, forming a nozzle exit edge 13 at their downstream end.

The trim ring 2 is displaceable in the axial direction between a first, upstream or axially frontal position and a second, downstream or axially rear position, wherein FIG. 1 shows the trim ring 2 in both positions. Depending on the axial position, the trim ring 2 opens or closes a bypass channel 3 that provides an additional cross-sectional surface. As a result, the nozzle throat surface of the flow channel 15 can be adjusted. Of course, the trim ring 2 can also take positions that are located between the first and the second position.

Figure 2:
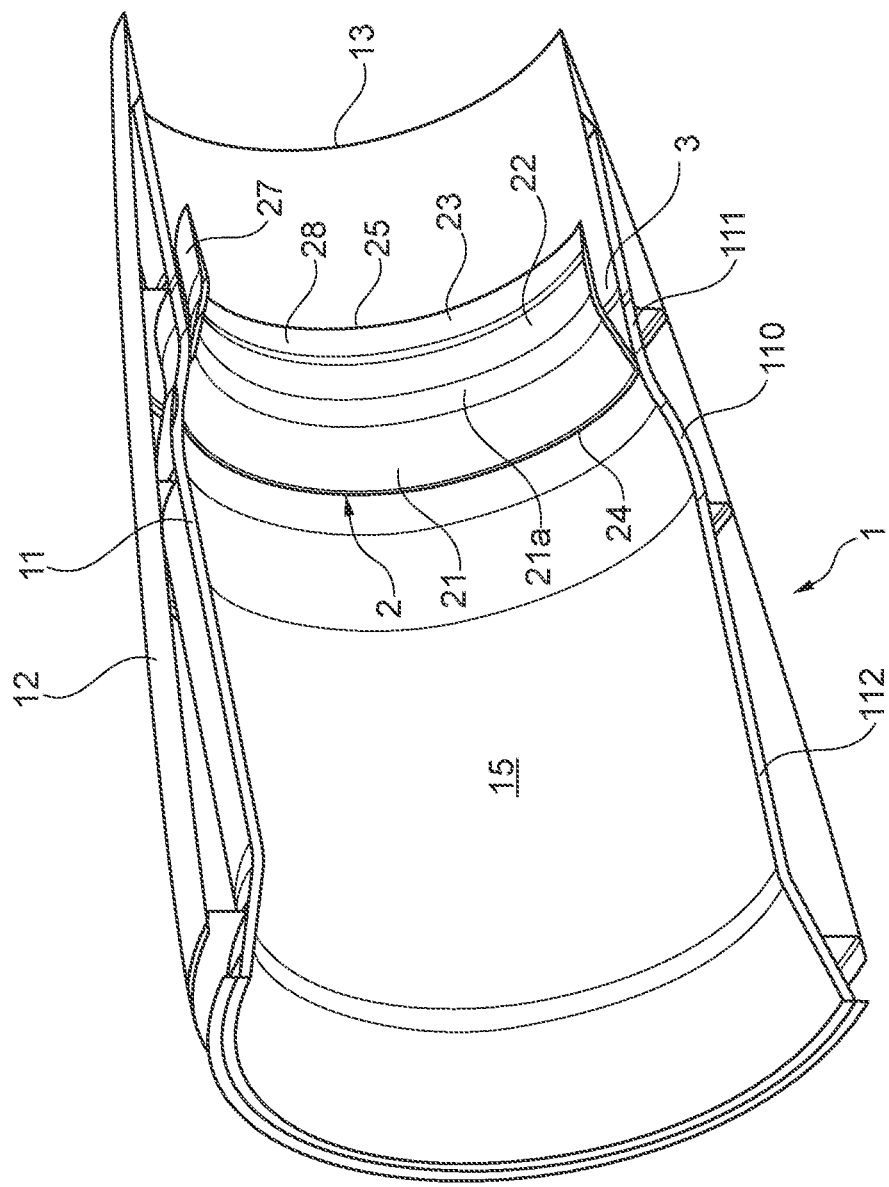
FIG. 2 shows the nozzle of FIG. 1 in a perspective sectioned view obliquely from the front, wherein the nozzle is arranged in an axially rear position.
Figure 3:
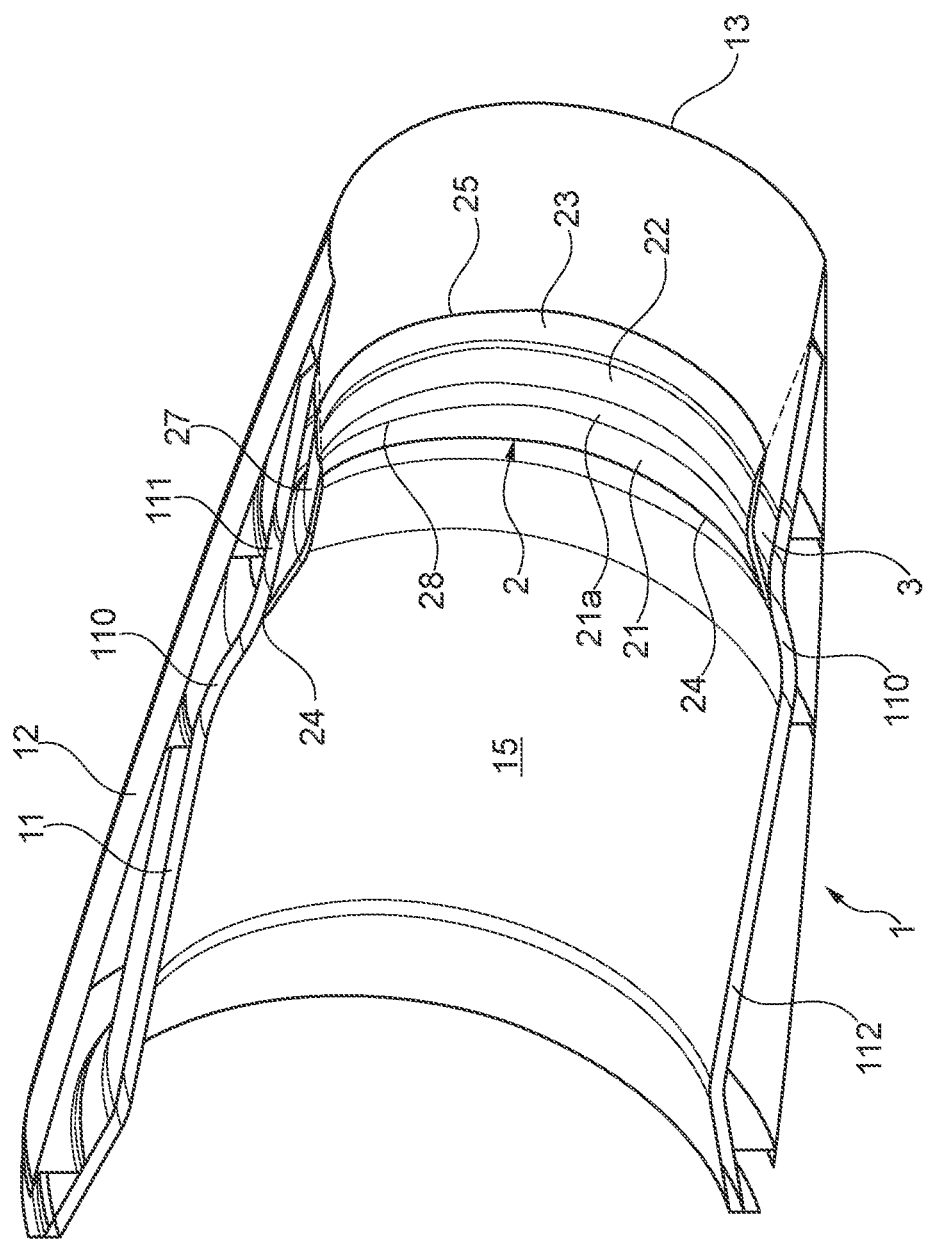
FIG. 3 shows the nozzle of FIG. 1 in a perspective sectioned view obliquely from behind, wherein the nozzle is arranged in an axially rear position.
Figure 4:
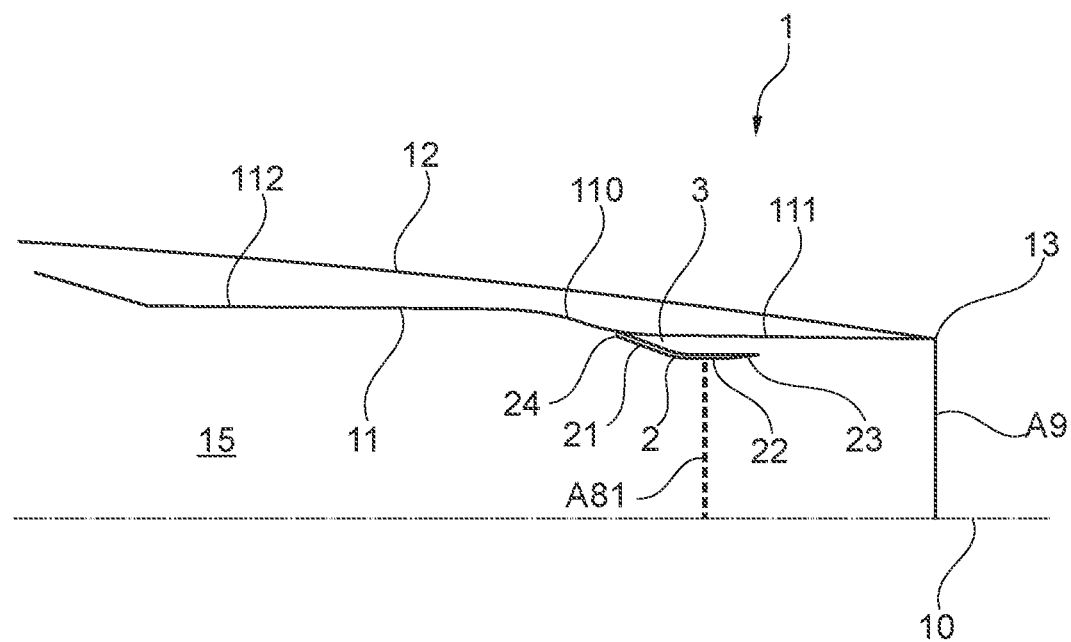
FIG. 4 shows a longitudinal section through the nozzle of FIG. 1, wherein the nozzle is arranged in an axially rear position corresponding to FIGS. 2 and 3.

FIGS. 2 to 4 show the nozzle 1 in a detailed rendering, wherein FIGS. 2 and 3 represent perspective renderings, and FIG. 3 represents a longitudinal section through the machine axis 10. As has already been explained with respect to FIG. 1, the nozzle comprises an inner wall 11, an outer wall 12, and an axially displaceable trim ring 2. The flow channel 15 that is delimited by the inner wall 11 extends inside the nozzle 1.

In an axially frontal section, the inner wall 11 of the nozzle 1 has a generally convergent course in the flow direction, i.e. the cross-sectional surface of the flow channel 15, which is delimited by the inner wall 11 radially outside, decreases in the flow direction. It reaches its minimum at the downstream end of a conically converging area 110 of the inner wall 11. Here, it is not absolutely necessary for the cross-sectional surface to constantly decrease. Rather, an intermediate area 112 can be provided, as shown, with the cross-sectional surface increasing or alternatively staying constant in the intermediate area 112 before the cross-sectional surface of the inner wall 11 drops to its minimum in the area 110.

Downstream of the conical area 110, the inner wall 11 forms a divergent area 111 in which the cross-sectional surface of the inner wall 11 increases. The divergent area extends up to the nozzle exit edge 13. Alternatively, instead of a divergent area 111, a cylindrical area or a cylindrical area to which a divergent area connects can be provided.

The trim ring 2 is embodied so as to be rotationally symmetric with respect to the machine axis 10 (cf. FIG. 4) of the turbofan engine. It comprises a leading edge 24, a trailing edge 25, an exterior side 27 that is facing towards the inner wall 11, and an inner side 28. In the axial direction, it forms three adjoining areas succeeding each other in the flow direction: an upstream area 21 that is conically shaped and converges in the flow direction, a cylindrical area 22 with a diameter that is constant over its axial length, and a divergent area 23 that is conically shaped, diverging in the flow direction. At that, the upstream conical area 21 forms a transitional area 21a towards the cylindrical area 22 in which the conical area 21 transitions into the cylindrical area 22, and in which it is correspondingly curved.

As can be seen in FIG. 4, the nozzle 1 forms a nozzle exit surface A9 at the discharge edge 13.

The trim ring 2 forms a smallest cross-sectional surface A81 in the cylindrical area 22. In alternative embodiments, it can be provided that the trim ring has a convex protrusion and its smallest cross-sectional surface is formed in the area of the protrusion.

The nozzle 1 is shown in FIGS. 2 and 3 in the second, downstream or axially rear position. In this position, the upstream leading edge 24 of the trim ring 2 abuts the downstream end of the conical area 110 of the inner wall 11. As a result, a bypass channel 3, which in the position of FIGS. 2 to 4 extends behind the leading edge 24 between the exterior side 27 of the trim ring 2 and the inner wall 11, is closed.

Since the bypass channel 3 is closed due to the arrangement of the trim ring 2 in the axially rear position, the entire flow inside the flow channel 15 flows through the cross-sectional surface that is formed by the trim ring 2, wherein, according to FIG. 4, the trim ring 2 forms the cross-sectional surface A81 as the smallest cross-sectional surface. Correspondingly, the smallest cross-sectional surface A81 of the trim ring in the axially rear position is identical to the smallest cross-sectional surface of the flow channel 15, i.e. to the nozzle throat surface.

Figure 5:
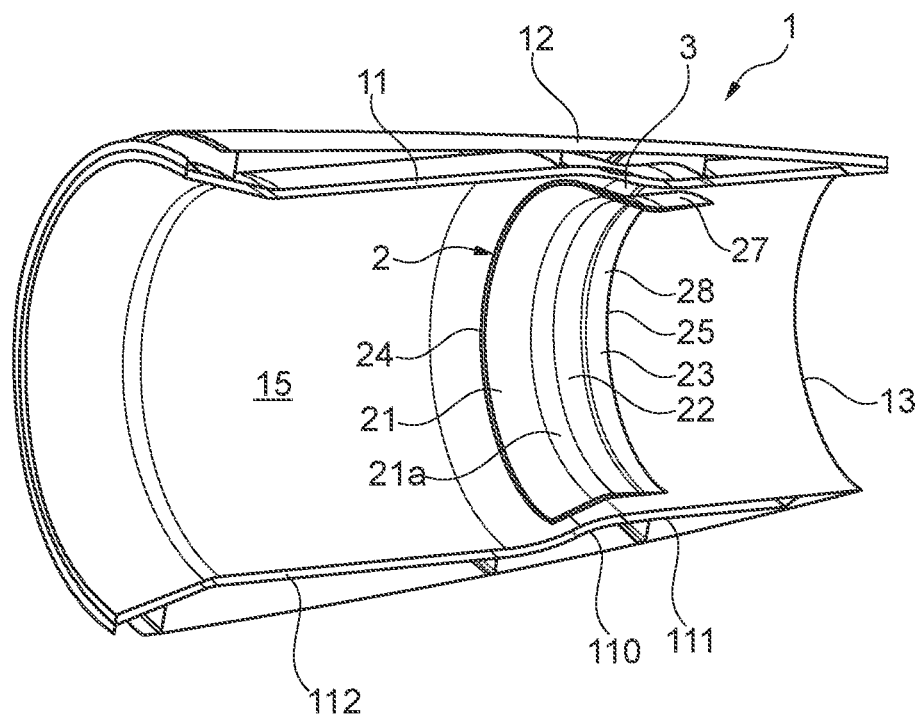
FIG. 5 shows the nozzle of FIG. 1 in a perspective sectioned view obliquely from the front, wherein the nozzle is arranged in an axially frontal position.
Figure 6:
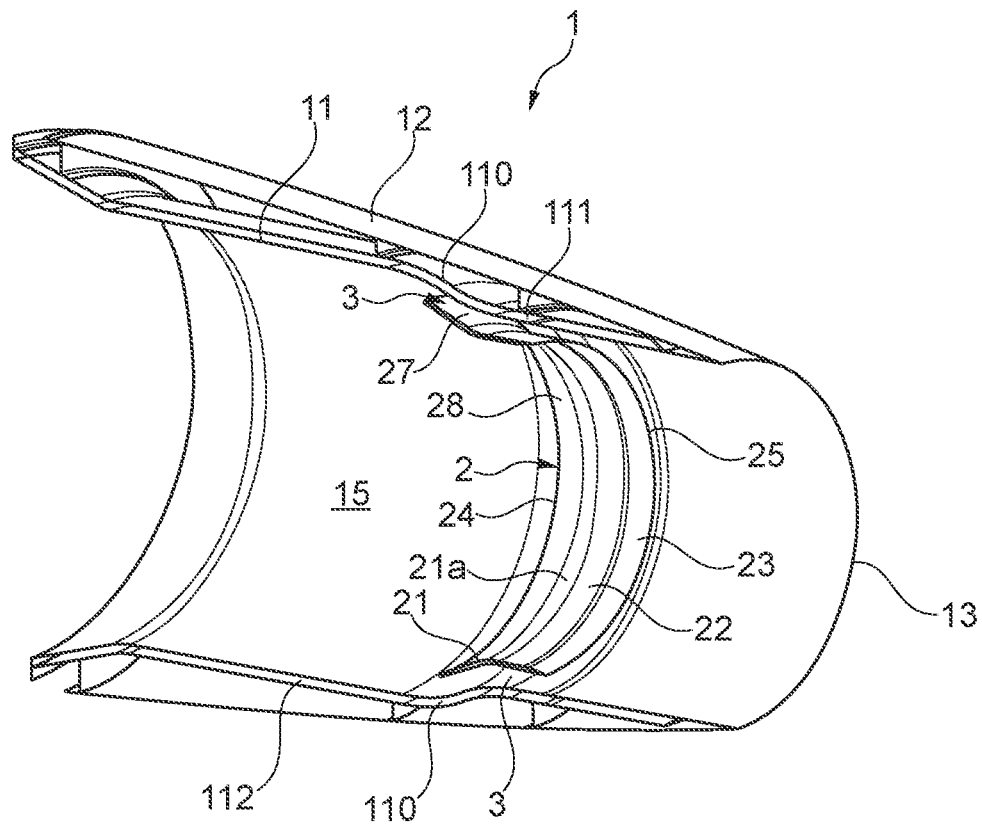
FIG. 6 shows the nozzle of FIG. 1 in a perspective sectioned view obliquely from behind, wherein the nozzle is arranged in an axially frontal position.

However, this situation changes when the trim ring 2 is displaced upstream into the axially frontal position, as will be explained in the following based on FIGS. 5 to 7.

Due to the axial displacement of the trim ring 2 into the axially frontal position, the bypass channel 3 is opened. It opens successively as the trim ring 2 is being displaced into the upstream direction. As the leading edge 24 of the trim ring 2 is removed from the inner wall 11, the leading edge forms a flow edge that divides the flow inside the flow channel 15 into a flow through the inside of the trim ring 2 and a flow through the bypass channel 3. At that, the bypass channel 3 is embodied in a ring-shaped and preferably also rotationally symmetric manner with respect to the machine axis 10 of the turbofan engine.

In the shown exemplary embodiment, it is provided that the conicity of the upstream area 21 of the trim ring 2 and the conicity of the conical area 110 of the inner wall 11 are embodied in the same manner, so that the trim ring 2 and the inner wall 11 extend substantially in parallel in the areas 21, 111. However, this is not necessarily the case. This entails the advantage that the bypass channel 3 has a substantially constant cross-sectional surface at least at its entrance, so that a maximally possible laminar flow can be created. Behind the entry section of the of the bypass channel 3, the bypass channel 3 slightly converges and forms a narrowest cross-sectional surface A82 of the bypass channel 3, cf. FIG. 7.

Due to this additional narrowest cross-sectional surface A82, the narrowest cross-sectional surface of the flow channel 15 is expanded, i.e. the nozzle throat surface is now formed by the sum of the cross-sectional surfaces A81 and A82. However, this means that the cross-sectional surface in the axially frontal position of FIGS. 5 to 7 has increased with respect to the axially rear position of FIGS. 2 to 4. Thus, the nozzle throat surface A81, A82, and consequently also the ratio of the nozzle exit surface A9 to the nozzle throat surface A81, A82, can be adjusted by means of the axial position of the trim ring 2.

Figure 7:
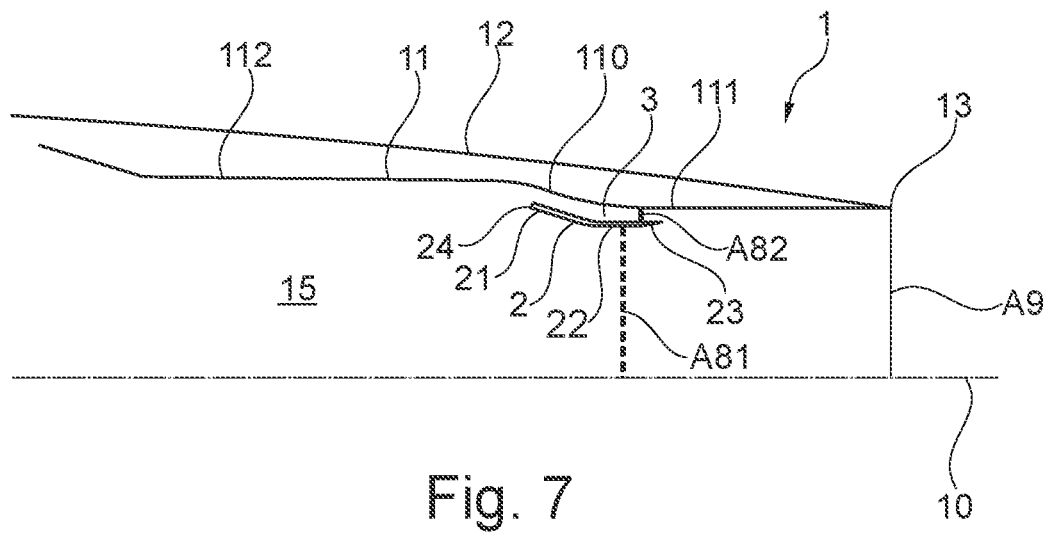
FIG. 7 shows a longitudinal section through the nozzle of FIG. 1, wherein the nozzle is arranged in an axially frontal position corresponding to FIGS. 5 and 6.

It is to be understood that the axial position of the narrowest cross-sectional surface A82 of the bypass channel 3 can differ from the axial position of the narrowest cross-sectional surface A81 of the trim ring 2, as shown in FIG. 7. However, this is not necessarily the case.

Behind the trim ring 2, the flow through the bypass channel 3 and the flow through the trim ring 2 are again combined into one flow, cf. FIG. 7. This can occur with negligible flow losses if the rear area 23 of the trim ring 2 is oriented in the flow direction.

In front of the nozzle throat surface, the flow velocity inside the nozzle is smaller than Ma=1 in all operating modes or axial positions of the trim ring. As for the nozzle throat surface, Ma=1 applies. Behind the nozzle throat surface A8, the flow velocity inside the nozzle is larger than Ma=1 in all operating modes with the exception of the operating mode MTO (maximum takeoff thrust).

The trim ring 2 may for example be made of a metallic or a ceramic material. It is embodied as a single piece. In alternative embodiments, the trim ring can be comprised of multiple partial rings that may for example correspond to the different areas 21, 20, 23, wherein the partial rings can be separately displaced.

Different adjusting mechanisms can be provided for axially displacing the trim ring 2 inside the nozzle 1. According to a first embodiment, an adjustment of the trim ring 2 is effected via actuators that may for example be embodied so as to work in telescope-like manner and that can be driven hydraulically, pneumatically or electrically. Here, it can be provided that such actuators are arranged along the circumference respectively at an angle to each other, thus form a truss-type construction. As for the actuators, they may for example be attached at the inner wall 11 with one end, and be attached at the exterior side of the trim ring 2 with one or multiple other ends. Such actuators are described in EP 3 081 797 A1, even as the respective description is provided a different context.

According to a second embodiment, an axial displacement of the trim ring 2 is realized through a linear adjustment. For example, the trim ring 2 has arms that project radially outwards through the bypass channel and are attached at carriage that is mounted in the inner wall 11 and is displaceable the in longitudinal direction on a rail, or the like.

Regarding terminology, the following should be pointed out: The term that is used for the ring 2, "trim ring" takes into account the fact that the ring forms the outer boundary of the flow channel 15 at least in the second position and insofar is a part of the trim of the flow channel. Alternatively, the trim ring can be referred to as an adjusting ring or as a ring-shaped deflector. The term "deflector" is fitting insofar as the ring divides the flow in all positions but the second position, separating them into a flow through the ring and a flow through the bypass channel.

In an alternative embodiment, the nozzle is embodied in a two-dimensional manner and correspondingly has an inner wall that delimits the flow channel through the nozzle radially outside and has a rectangular cross section. A convergent-divergent course corresponding to FIGS. 1 to 7 is present at least at two of the four walls forming the flow channel (at the two side walls and/or at the top wall and the bottom wall). In that case, the trim ring can also be embodied with a rectangular cross section. Here, the trim ring and the individual walls act together for adjusting the nozzle throat surface depending on the axial position of the trim ring, in manner corresponding to the one described with respect to a rotationally symmetric nozzle based on FIGS. 1 to 7.

FIGS. 8 to 11 respectively show, in the longitudinal section, a further exemplary embodiment of the invention with a trim ring that is displaceable in the axial direction 2. The displaceability of the trim ring 2 is realized as described with respect to FIGS. 1 to 7, so that the latter are additionally referred to. The special feature of the exemplary embodiments of FIGS. 8 to 11 is that the nozzle 1 forms a displaceable ring 14 at its downstream end (downstream of the nozzle throat surface), with the displaceable ring 14 also being displaceable in the axial direction between a first, upstream position and a second, downstream position. In the following, this displaceable ring 14 is also referred to as a nozzle exit ring 14. A flow 5, which extends at the outer boundary of the flow channel and via which the effective nozzle exit surface $A9_{eff}$ at the end of the nozzle can be reduced and adjusted, can optionally be engaged via a nozzle exit ring 14.

Figure 8:
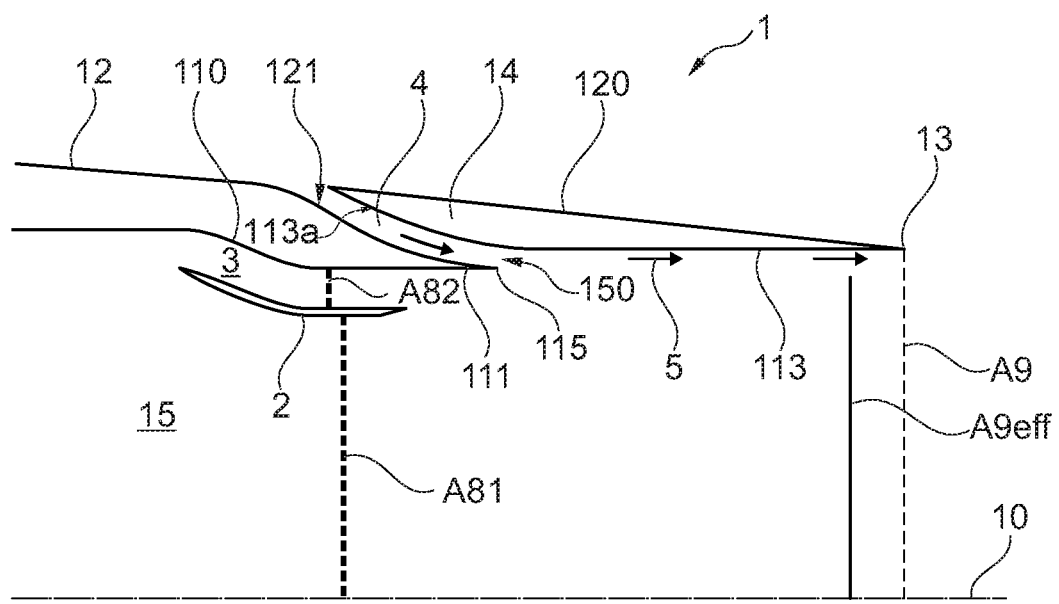
FIG. 8 shows, in the longitudinal section, a further exemplary embodiment of a nozzle with a trim ring that is displaceable in the axial direction, wherein the nozzle further forms an axially displaceable nozzle exit ring at its downstream end.
Figure 9:
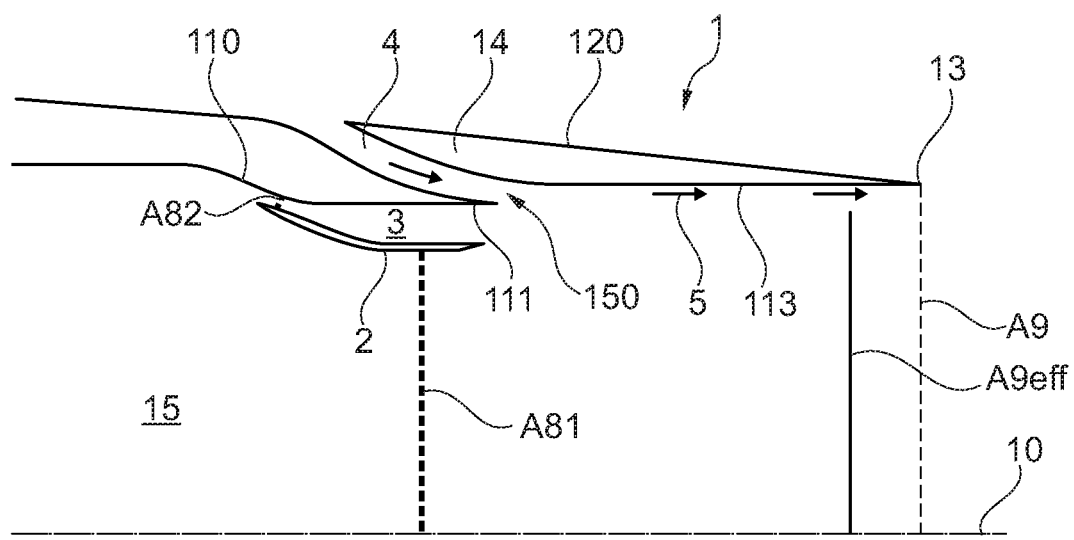
FIG. 9 shows the nozzle of FIG. 8 with different axial positions of the trim ring and the nozzle exit ring.
Figure 10:
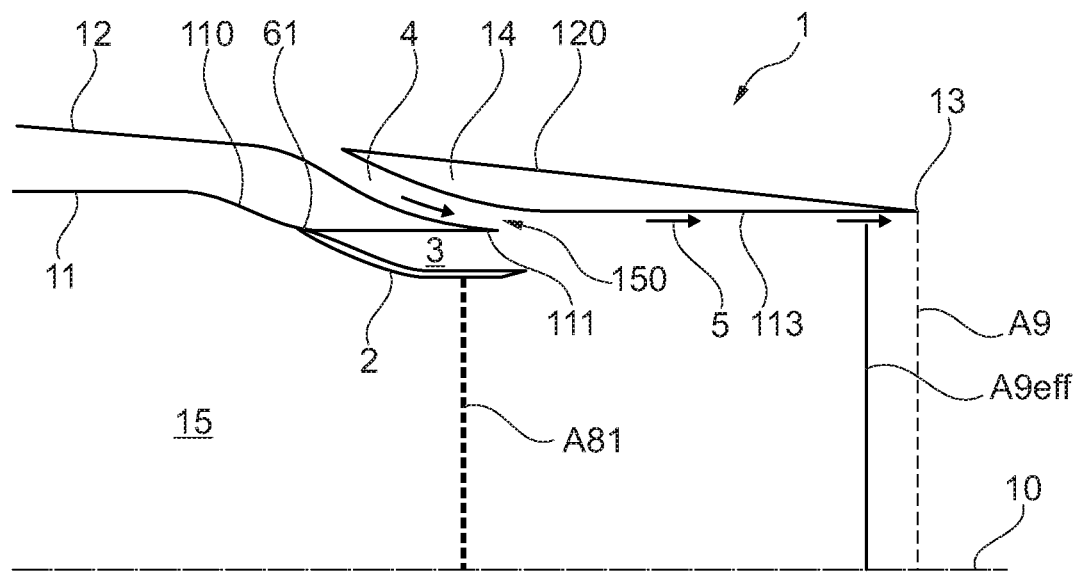
FIG. 10 shows the nozzle of FIG. 8 with different axial positions of the trim ring and the nozzle exit ring.

Thus, the nozzle 1 according to FIG. 10 comprises an inner wall 11 and an outer wall 12. The inner wall 11 forms a converging area 110 and a cylindrical (or alternatively divergent) area 111 connecting thereto. A trim ring 2 that is embodied corresponding to FIGS. 1 to 7 is arranged in an axially displaceable manner, wherein a bypass channel 3 providing an additional cross-sectional surface A82 is maximally opened in the axial position of FIG. 8, is closed in FIG. 10, and is partially opened in FIGS. 9 and 11. Insofar, the exemplary embodiment of FIGS. 8 to 11 does not differ from the exemplary embodiment of FIGS. 1 to 7.

Figure 11:
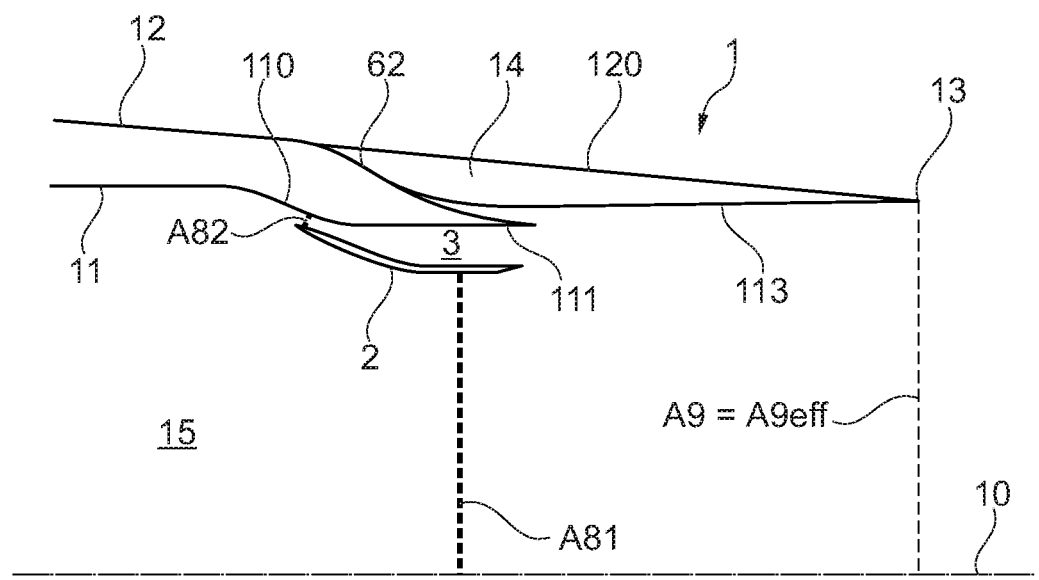
FIG. 11 shows the nozzle of FIG. 8 with different axial positions of the trim ring and the nozzle exit ring.

However, in the exemplary embodiment of FIGS. 8 to 11, the downstream area of the nozzle 1 is not formed by stationary walls, as is the case in FIGS. 1 to 7, but instead comprises a nozzle exit ring 14 that is displaceable in the axial direction. At that, the ring 14 can be displaced between an upstream position, which is shown in FIG. 11, and a downstream position, which is shown in FIG. 9, by means of actuators that are not shown. In FIGS. 8 and 10, it is respectively shown in an intermediate position.

The ring 14 comprises an outer wall 120 and an inner wall 113. Downstream, the outer wall 120 and the inner wall 113 converge and form the nozzle exit edge 13 of the nozzle 1. The inner wall 113 forms the extension of the inner wall 111 as it delimits the flow channel 15 at the rear end of the nozzle radially outside. When the ring 14 is not in the upstream position corresponding to FIG. 11, it opens a ring-shaped additional flow channel 4 through which air is conducted from the exterior side of the engine into the flow channel 15.

According to FIG. 8, the additional flow channel 4 is formed by the wall areas 121, 113a that are positioned at an axial distance to each other, wherein the wall area 113a forms the inner wall of the flow channel 15 further downstream than the wall area 113. The additional flow channel 4 extends in a ring-shaped manner and is embodied so as to extend substantially in the axial direction at its end 150 that is facing the flow channel 15. Behind an edge 115 that is formed by the tapering walls 111, 121, it opens to the flow channel 15. In this position, a transition to the flow channel is present in a sense.

The curvature of the additional flow channel 4 thus extends in such a manner that the axial component of the extension direction becomes larger and the radial component becomes smaller towards the end 150 of the additional flow channel 4, wherein the radial component can take on the value of zero or low values at the end 150 of the additional flow channel 4.

Due to this curvature and the course of the additional flow channel 4 that opens towards the flow channel 15 in a substantially axial orientation, the flow 5 flows into the flow channel 15 at least approximately in the axial direction, and thus flows in an outer edge area that adjoins the inner wall 113 of the nozzle exit ring 14. In this manner, it is achieved that the flow flowing in through the flow channel 5 does not generate any major turbulences. As it forms a boundary flow that adjoins the inner wall 113, it prevents the flow of the flow channel 15, after it has passed the nozzle neck A81, A82, from flowing up to the inner wall 113. As a result, the geometrical nozzle exit surface A9 as it is defined by the discharge edge 13 is reduced to a smaller effective nozzle exit surface $A9_{eff}$ as compared to the geometrical nozzle exit surface A9.

Thus, an effective nozzle exit surface $A9_{eff}$ can be varied and adjusted through the flow 5 or the additional flow channel 4.

The actuators that are used for adjusting the ring 14 can for example be hydraulic, pneumatic or electrical actuators working in a telescope-like manner and being affixed at the exterior side of the nozzle at the outer wall 12 and the outer wall 120.

FIG. 8 shows the trim ring 2 and the nozzle exit ring 14 in axial positions which can be set during the takeoff thrust MTO. Since the additional cross section A82 is provided, the nozzle throat surface is at its maximum. At the same time, a flow 5 is provided through the additional flow channel 4, leading to a reduction of the effective nozzle exit surface from the geometrical nozzle exit surface A9 to $A9_{eff}$.

FIG. 9 shows the nozzle in an operating mode as it is present during subsonic cruising flight. The trim ring 2 is displaced axially downstream, so that the cross-sectional surface A82 is reduced as compared to the position of FIG. 8. At the same time, the nozzle exit ring 14 is displaced to a maximum downstream, so that the flow 5 through the additional flow channel 4 is at its maximum, and correspondingly the effective reduction of the nozzle exit surface A9 is also at its maximum, with $A9_{eff}$ thus being at its minimum.

FIG. 10 shows the transsonic case. The trim ring 2 is displaced downstream to a maximum, so that the bypass channel 3 is closed. The nozzle exit ring 14 is in an axial position in which the additional flow channel 4 is slightly opened. The resulting flow 5 prevents the flow in the flow channel 15 behind the nozzle throat surface A81 from expanding up to the nozzle exit edge 13. What is present, is a slightly reduced effective nozzle exit surface $A9_{eff}$.

Here, it can be provided that the trim ring 2 does not completely close off the bypass channel 3 in the downstream position, but rather that a small gap 61 remains, with gas of the flow channel 15 being conducted through the same into the bypass channel 3 to a minor degree. This may serve for avoiding or reducing turbulences behind trim ring 2. This embodiment variant can also be provided in the exemplary embodiment of FIGS. 1 to 7.

FIG. 11 shows the engine in an operating mode corresponding to the supersonic cruising flight. The position of the trim ring 2 corresponds to that of FIG. 9. But now the nozzle exit ring 14 is displaced upstream to a maximum, so that the additional flow channel 4 is closed. Now, the flow in the flow channel 15 expands up to the nozzle exit edge 13 behind the nozzle throat surface A81, A82. In this case, the structural nozzle exit surface A9 is identical to the effective nozzle exit surface $A9_{eff}$.

Here, it can be provided that the nozzle exit ring 14 does not completely close the additional flow channel 4 in the upstream position, but rather that a small gap 62 remains through which air is guided into the additional flow channel 4 to a minor degree. This may serve for avoiding or reducing turbulences.

It is to be understood that the described variation of the effective nozzle exit surface by providing an additional flow by means of an axially displaceable nozzle exit ring 14 and an additional flow channel 4 with a flow 5 that can be optionally opened by means of axially displaceable nozzle exit ring 14 can in principle be realized independently of whether the nozzle has an axially displaceable trim ring 2, or not. Rather, such an adjustment and regulation of the effective nozzle exit surface $A9_{eff}$ can also be realized in other nozzles, for example also in nozzles in iris/petal design according to the state of the art.

The present invention is not limited in its embodiment to the above-described exemplary embodiments, which are to be understood merely as examples. For instance, the specific shape and axial length of the trim ring and the inner wall are to be understood merely as examples.

It is furthermore pointed out that the features of the individually described exemplary embodiments of the invention can be combined in various combinations with one another. Where areas are defined, they include all the values within these areas and all the sub-areas falling within an area.

What is claimed is:

1. A convergent-divergent nozzle for a turbofan engine of a supersonic aircraft, wherein the nozzle comprises:
   an inner wall, the inner wall forming a flow channel with a nozzle throat surface and a nozzle exit surface,
the inner wall radially delimiting an exterior of the flow channel through the nozzle,
a trim ring that is displaceable in an axial direction between a first position and a second position, wherein the inner wall of the nozzle and the trim ring are configured and positioned with respect to each other in such a manner that;
the trim ring extends at a radially inward distance to the inner wall in the first position forming an annular bypass channel extending between the trim ring and the inner wall of the nozzle, the bypass channel providing an additional cross-sectional surface of the flow channel,
the trim ring abuts the inner wall in the second position,
the bypass channel is closed in the second position,
in the first position, the nozzle throat surface is formed by a sum of a smallest cross-sectional surface of the trim ring and a smallest cross-sectional surface of the bypass channel, and
in the second position, the nozzle throat surface is formed by a narrowest cross-sectional surface of the trim ring.

2. The nozzle according to claim 1, wherein the first position is an upstream position and the second position is a downstream position, wherein in the upstream position the bypass channel is formed between the trim ring and the inner wall of the nozzle, and in the downstream position the trim ring abuts the inner wall.

3. The nozzle according to claim 1, wherein the inner wall of the nozzle and the trim ring are configured and positioned with respect to each other in such a manner that a minimal cross-sectional surface of the bypass channel and thus the nozzle throat surface of the flow channel is successively reduced as the trim ring is displaced from the first position into the second position.

4. The nozzle according to claim 1, wherein the trim ring has an upstream area that converges in a flow direction and connected downstream to the upstream area is at least one chosen from a cylindrical area or an area that diverges in the flow direction.

5. The nozzle according to claim 4, wherein the trim ring includes the cylindrical area adjoining the upstream area, and the area that diverges in the flow direction.

6. The nozzle according to claim 1, wherein the inner wall of the nozzle forms a convergent area in which the additional cross-sectional surface of the inner wall converges in a flow direction.

7. The nozzle according to claim 6, wherein the inner wall of the nozzle forms at least one chosen from a cylindrical area or a divergent area downstream of the convergent area.

8. The nozzle according to claim 6, wherein the trim ring includes an upstream area that converges in the flow direction and connected downstream of the upstream area is at least one chosen from a cylindrical area or an area that diverges in the flow direction, and wherein the upstream area of the trim ring and the convergent area of the inner wall extend at least partially across a same axial area of the nozzle when the trim ring is in the first position.

9. The nozzle according to claim 8, wherein the upstream area of the trim ring and the convergent area of the inner wall extend substantially in parallel to each other when the trim ring is in the first position.

10. The nozzle according to claim 1, wherein the trim ring includes an upstream area that converges in a flow direction and connected downstream of the upstream area is at least one chosen from a cylindrical area or an area that diverges in the flow direction, and wherein an upstream edge of the upstream area of the trim ring abuts the inner wall of the nozzle in the second position.

11. The nozzle according to claim 10, wherein the inner wall of the nozzle forms a convergent area in which the additional cross-sectional surface of the inner wall converges in the flow direction, and wherein the upstream edge abuts the inner wall of the nozzle in the convergent area of the inner wall or at a transition of the convergent area to a cylindrical or divergent area connecting thereto downstream.

12. The nozzle according to claim 1, wherein in the second position, the trim ring abuts at the inner wall along a circumferential line.

13. The nozzle according to claim 1, wherein the inner wall of the nozzle is non-adjustable.

14. The nozzle according to claim 1, wherein the nozzle is a three-dimensional nozzle.

15. The nozzle according to claim 1, wherein, at a downstream end of the nozzle, the nozzle includes a nozzle exit ring that is displaceable in the axial direction between a first, upstream position and a second, downstream position, wherein
the nozzle, in the second position of the nozzle exit ring, forms an annular additional flow channel that extends from an outer skin of the nozzle to the flow channel, and via which ambient air can flow into the flow channel,
the annular additional flow channel is closed in the first position of the nozzle exit ring, and
the annular additional flow channel is configured such that air that is discharged from the additional flow channel forms a radially outer boundary flow in the flow channel.

16. A convergent-divergent nozzle for a turbofan engine of a supersonic aircraft, comprising:
an inner wall forming and delimiting an exterior of a flow channel through the nozzle, wherein the flow channel includes a nozzle throat surface and a nozzle exit surface,
a trim ring that is displaceable in an axial direction between a first position and a second position, wherein
the inner wall of the nozzle and the trim ring are configured and positioned with respect to each other in such a manner that;
the trim ring extends at a radially inward distance to the inner wall in the first position forming an annular bypass channel extending between the trim ring and the inner wall of the nozzle,
the trim ring abuts the inner wall in the second position,
the bypass channel is closed in the second position;
the trim ring includes an upstream area that converges in a flow direction and connected downstream of the upstream area is at least one chosen from a cylindrical area or an area that diverges in the flow direction,
the inner wall of the nozzle forms a convergent area in which a cross-sectional surface of the inner wall converges in the flow direction, and
an upstream edge of the upstream area of the trim ring abuts the inner wall of the nozzle in the second position.

17. A method for adjusting a nozzle throat surface in a nozzle of a turbofan engine, comprising:
providing a nozzle that comprises:
an inner wall, the inner wall forming a flow channel with a nozzle throat surface and a nozzle exit surface, the inner wall radially delimiting an exterior of the flow channel through the nozzle, a trim ring that is displaceable in an axial direction between a first position and a second position, wherein the inner wall of the nozzle and the trim ring are embodied and positioned with respect to each other in such a manner that;

the trim ring extends at a radially inward distance to the inner wall in the first position, forming an annular bypass channel extending between the trim ring and the inner wall of the nozzle, the bypass channel providing an additional cross-sectional surface of the flow channel, the trim ring abuts the inner wall in the second position, the bypass channel is closed in the second position, and in the second position, the nozzle throat surface is formed by a narrowest cross-sectional surface of the trim ring, displacing the trim ring between the first position and the second position for setting a smallest cross-sectional surface of the bypass channel, wherein the nozzle throat surface of the nozzle is formed by a sum of the smallest cross-sectional surface of the bypass channel and a smallest cross-sectional surface of the trim ring.

18. The method according to claim 17, wherein, for setting a maximum nozzle throat surface, the trim ring is displaced into a maximally upstream position as the first position.

19. The method according to claim 17, wherein, for setting a minimal nozzle throat surface, the trim ring is displaced into a maximally downstream position as the second position.

* * * * *